US012667786B2

(12) United States Patent
Houston et al.

(10) Patent No.: US 12,667,786 B2
(45) Date of Patent: Jun. 30, 2026

(54) GAME DESIGNER TOOL FOR SCRIPTING COMPLEX GAMEPLAY ACTIONS

(71) Applicant: DISCORD INC., San Francisco, CA (US)

(72) Inventors: Joseph Houston, Flagstaff, AZ (US); Preston Hulcy, Burleson, TX (US)

(73) Assignee: DISCORD INC., San Francisco, CA (US)

( * ) Notice: Subject to any disclaimer, the term of this patent is extended or adjusted under 35 U.S.C. 154(b) by 711 days.

(21) Appl. No.: 18/146,099

(22) Filed: Dec. 23, 2022

(65) Prior Publication Data
US 2024/0207740 A1 Jun. 27, 2024

(51) Int. Cl.
| A63F 13/60 | (2014.01) |
| A63F 13/537 | (2014.01) |
| G06F 8/30 | (2018.01) |
| G06F 8/41 | (2018.01) |
| G06F 9/54 | (2006.01) |

(52) U.S. Cl.
CPC ............ *A63F 13/60* (2014.09); *A63F 13/537* (2014.09); *G06F 8/30* (2013.01); *G06F 8/41* (2013.01); *G06F 9/542* (2013.01)

(58) Field of Classification Search
CPC ............................... A63F 13/60; A63F 13/537
See application file for complete search history.

(56) References Cited

U.S. PATENT DOCUMENTS

| 6,951,022 B1* | 9/2005 | Golde | G06F 9/542 |
| | | | 719/318 |
| 9,454,993 B1* | 9/2016 | Lawson | H04N 21/47205 |
| 10,223,176 B1* | 3/2019 | Chen | G06F 8/41 |
| 10,909,754 B1* | 2/2021 | Hardiman | A63F 13/52 |
| 2010/0257211 A1* | 10/2010 | Glowacki | G06F 11/3676 |
| | | | 717/124 |
| 2010/0332968 A1* | 12/2010 | Squillace | G06F 9/542 |
| | | | 717/114 |
| 2012/0110448 A1* | 5/2012 | Jhoney | G06F 9/45512 |
| | | | 715/704 |

(Continued)

OTHER PUBLICATIONS

Physics Manager. docs.unity3d.com. Online. Jul. 5, 2022. Accessed over the Internet. Accessed Jul. 5, 2025. <URL: https://web.archive.org/web/20220705102316/https://docs.unity3d.com/550/Documentation/Manual/class-PhysicsManager.html> (Year: 2022).*

(Continued)

*Primary Examiner* — Carl V Larsen
(74) *Attorney, Agent, or Firm* — POLSINELLI PC // (DC OFFICE)

(57) ABSTRACT

The present technology provides a scripting tool, built on top of an object component architecture of a game engine for creating games, that binds an event class for a tagged event handler in code at compile time. The event handler in code is tied to movement of one or more objects and associated effects within a game environment. Through the scripting tool, game engineers generate and define an event handler in code for the designers to discover and add various other effects to in forming gameplay sequences. The game designers tag the event along with the other effects, and at compile time, forming an event class including the tagged effects.

20 Claims, 8 Drawing Sheets

(56) References Cited

U.S. PATENT DOCUMENTS

| 2014/0149921 | A1* | 5/2014 | Hauser | G06F 3/0488 |
| | | | | 715/784 |
| 2019/0196886 | A1* | 6/2019 | Chen | G06F 8/34 |
| 2020/0356350 | A1* | 11/2020 | Penland | G06F 8/34 |
| 2021/0042023 | A1* | 2/2021 | Kerber, III | G06F 8/65 |
| 2021/0064391 | A1* | 3/2021 | Nguyen | G06F 16/9566 |
| 2021/0086081 | A1* | 3/2021 | Horstman, III | A63F 13/63 |

OTHER PUBLICATIONS

Pacheco. Using an Event Manager to Decouple your Game in Unity. Online. Mar. 17, 2020. Accessed via the Internet. Accessed Feb. 5, 2026. <URL: https://bernardopacheco.net/using-an-event-manager-to-decouple-your-game-in-unity> (Year: 2026).*

\* cited by examiner

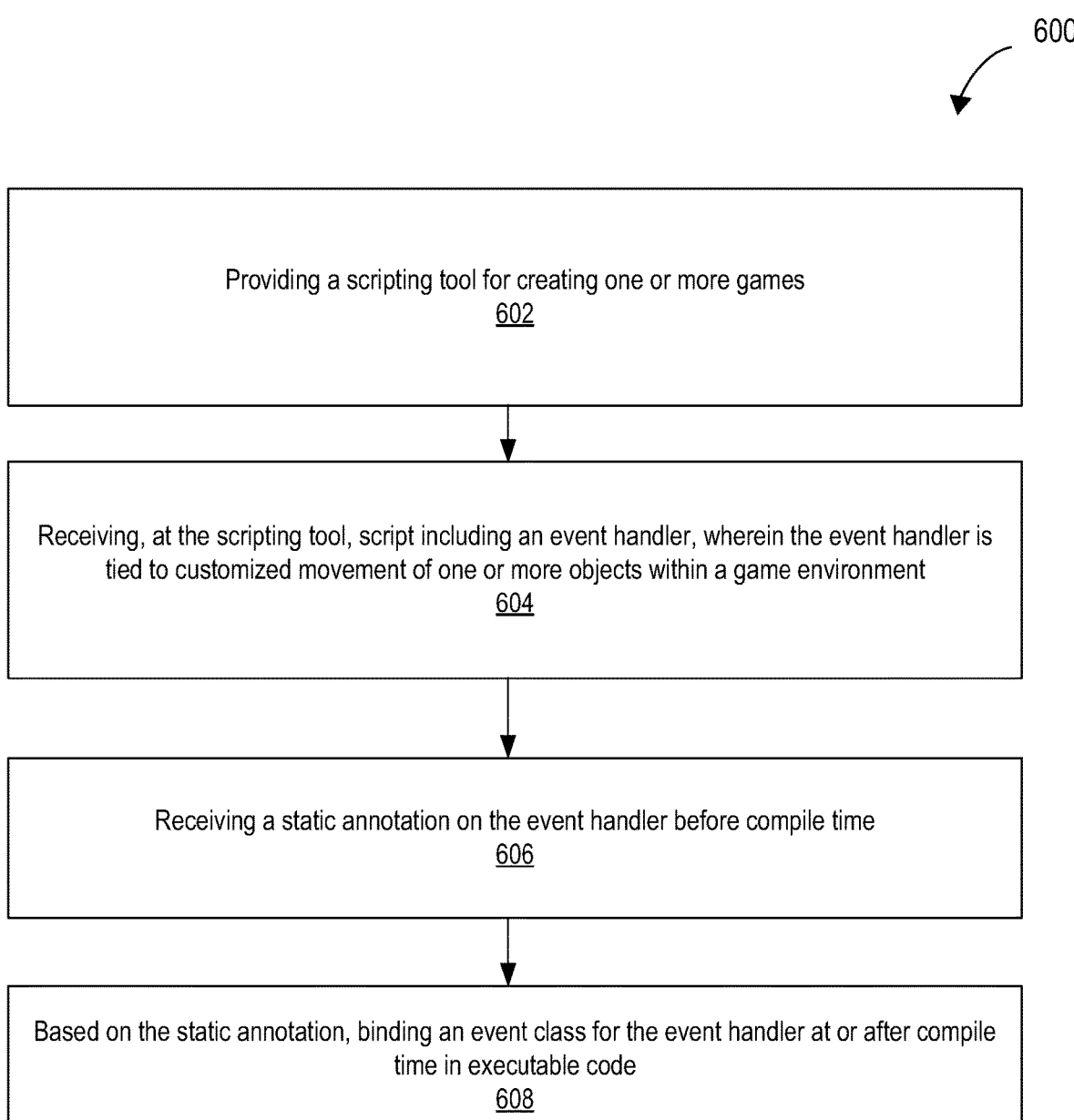

600

Providing a scripting tool for creating one or more games
602

Receiving, at the scripting tool, script including an event handler, wherein the event handler is tied to customized movement of one or more objects within a game environment
604

Receiving a static annotation on the event handler before compile time
606

Based on the static annotation, binding an event class for the event handler at or after compile time in executable code
608

FIG. 6

GAME DESIGNER TOOL FOR SCRIPTING COMPLEX GAMEPLAY ACTIONS

BACKGROUND

Some social networks are developed around friendships, professional relationships, or other individual connections, and some social networks create communities around topics. Often social networking platforms provide services through which users can form or interact within a social network. Users can generally post comments or other content, make connections, add links, or simply browse content created by others. Some social networks have moderators that moderate the content in their respective social networks or online communities. While social networks can provide entertainment, networking, commercial, or informational value, they are also subject to various challenges. For social networks that provide a gaming aspect, providing new games to the platform may help with retention. As such, finding and resolving bottlenecks in game production may be useful not only for video game companies but also for social network platforms offering games. One of the ways to help with making the game production process more efficient is by solving the need for simple, yet powerful, tools for non-technical game designers to script complex gameplay actions inside of video games.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIG. 6 illustrates an example flowchart diagram for binding an event class for an event handler in code at compile time in executable code based on a static annotation in code received before compile time in accordance with some aspects of the present technology.

DETAILED DESCRIPTION

Figure 1:
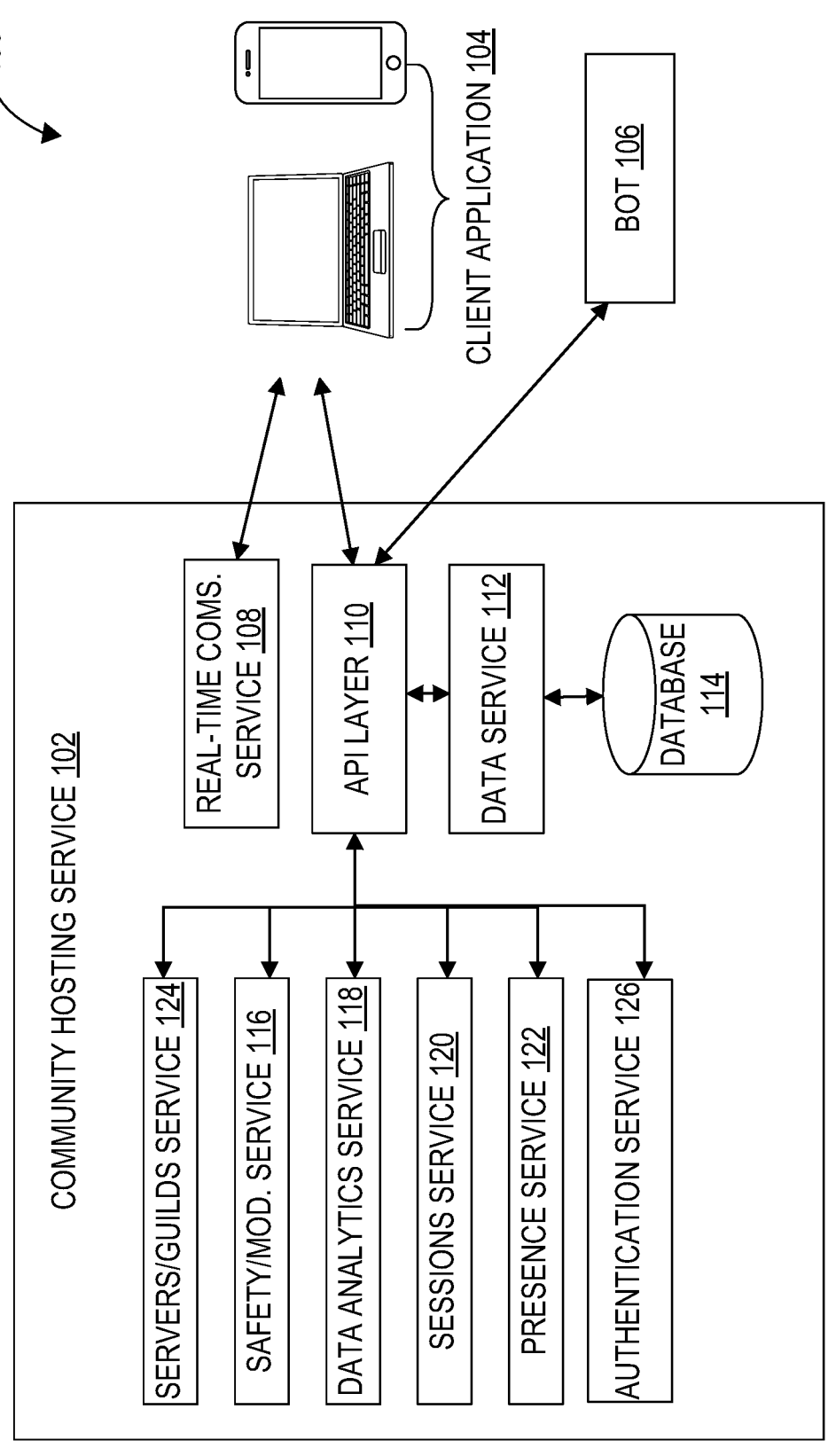
FIG. 1 illustrates an example system that is configured to support user accounts in creating, managing, and participating in online communities in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for a scripting tool, built on top of an object component architecture of a game engine for creating games, that binds an event class for a tagged event handler in code at compile time. The event handler in code may be tied to the movement of one or more objects and associated effects within a game environment. Through the scripting tool, game engineers may generate and define an event handler in code for the designers to discover and add various other effects in forming gameplay sequences.

More specifically, a game designer may have an option to select from a collection of events, conditions, and reactions to coordinate the invocation of various objects' methods, and thus construct a particular gameplay sequence or action. The game designer may tag the event along with the other effects, and at or near compile time, an event class including the tagged effects may be formed. The event class may then be used again in other gameplay sequences as a "plug-and-play" event. For example, an event for two objects colliding.

Traditionally, binding a string representation of a method or the actual method on the object itself was done at runtime by using an analysis tool such as reflection (e.g., C# reflection). Other languages, such Visual Basic and CL C++, that may produce intermediate language (IL) byte code may also be used. However, using reflection has a significant, negative impact on the runtime performance because the Common Language Runtime (CLR) needs to search inside an object's metadata to find the actual method before it is able to be invoked. Furthermore, reflection was not written for game development, and that amount of searching takes a considerable amount of processing time for a game to perform.

Here, binding of an object's method string name to its actual method at compilation time (e.g., C# compilation time) eliminates overhead at runtime. In other words, a separate layer is used to inject the binding code into the executable, which is what is then called at runtime. The binding code that is injected makes no use of strings at all (which would otherwise be necessary) and also eliminates the need to search for the method by name. This brings down the generation of garbage, which is the compilation of tiny objects that get stacked up and need to be eventually cleaned off to nearly zero. Garbage generation is especially bad for game development.

Furthermore, in some cases, the games are run in a web browser, such as on WebGL and a mobile device. By binding the event class at compile time, the games may perform to an acceptable standard given the limited constraints that come with running games on web browsers and mobile devices.

In some cases, the reactions may include effects for how the object behaves, transforms visually and/or physically, interacts with other objects, etc. The set of conditions may be based on any game condition that the game designer wants to set as what causes the changes in the object's behavior. As an example, a game designer may create an event for an object (e.g., a bumper car, a ball, a character, etc.), that when the object spawns, the conditions require that a location of the object is determined, and depending on where the object comes from, changing their appearance by, for example, changing the appearance of their material, color, size, etc. An animator for the game may also change animation effects of objects in a similar manner.

Although the present disclosure broadly covers the use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

FIG. 1 illustrates an example system 100 configured to support user accounts in creating, managing and participating in online communities. In particular, the system 100 supports a plurality of user accounts interacting with each other in communities to which they belong.

The system 100 illustrates an example architecture in which users of user accounts interact through an instance of client application 104 operating on a computing device. The client application 104 can be provided by a webpage rendered in a web browser or a downloaded client application executed by an operating system of the computing device. In some embodiments, some disparate collections of features or functionality might be available in client application 104 depending on the capabilities of the environment executing or rendering the client application 104.

The system 100 also includes a community hosting service 102, which provides an infrastructure for supporting the plurality of user accounts interacting with each other in communities to which they belong. The community hosting service 102 can be a distributed service hosted in a cloud computing architecture. The community hosting service 102 is responsible for hosting various services accessible to the user accounts by the client application 104.

In some embodiments, the community hosting service 102 provides a servers/guilds service 124 to enable user accounts to set up a server (also referred to as a guild) to host members interacting around one or more channels. A server (or guild) is a user-created environment supporting a community. A server is generally configured with one or more channels which are generally created around topics or subtopics, or groups of people, and can support exchanges of communications between user accounts. Some channels are non-real-time channels where users communicate through written messages, images, emojis, recorded voice or video files, attachments, etc. Some channels are real-time communications channels that support voice or video communications. Some channels may be able to support both non-real-time messaging and real-time communications.

A user account can operate their instance of the client application 104 to create a server at the community hosting service 102. In some embodiments, this will be performed by the client application 104 calling the API layer 110 requesting to create a new server. The API layer 110 can then interact with servers/guilds service 124 to create the server by providing the server with a unique identifier and associating various configurations requested by the user account. Once the server is created, the user account that created the server can be considered the owner and/or admin for the server. The servers/guilds service 124 can record the information about the server using data service 112 to store information about the server in database 114.

In some embodiments, servers can be configured to be public or private. A public server is one that any user can search for and request to join. A private server is one that a user needs to be invited to join. Depending on the configuration of the private server, a user can be invited by another user or may need to be invited by the administrator of the private server. Users can request to join a public or private server, and an entity with administrative privileges can grant the request.

In some embodiments, servers can be managed by the user account that created the server. Additionally, server administrators can delegate privileges to other user accounts to be administrators, and administrators can also create or invite bots 106, such as a chatbot, to perform some administrative actions.

In addition to approving user accounts to join a server, administrators can also set up various safety or content moderation policies. In some embodiments, those policies are enforced by user accounts with the administrator role for the server. In some embodiments, the policies can be enforced by software services provided by the community hosting service 102, such as the Safety/moderation service 116 or bot 106.

As introduced above, servers are environments for supporting a community and are generally created around topics. In furtherance of that function, servers can be configured to integrate content through embedded channels or webhooks. For example, an administrator of a server might integrate a YOUTUBE channel, a TWITCH feed, or a TWITTER feed into one or more channels of the server when the content of those channels or feeds are relevant to the channel. In some embodiments, a server can follow a channel offered by another server supported by the community hosting service 102.

In addition to hosts, user accounts that are members of a server can also use their instance of client application 104 to interact with the community hosting service 102. The client application 104 can make requests of the community hosting service 102 to initiate a session with the community hosting service 102 and to access servers and channels to which the user account is a member, receive notifications and send messages, and otherwise communicate in the channels in which they belong.

As illustrated in FIG. 1, community hosting service 102 provides a variety of services that can be called by client application 104 or other services of the community hosting service 102.

For example, the community hosting service 102 includes a servers/guilds service 124. The servers/guilds service 124, as described above, can be used to create and administer a server. Additionally, the servers/guilds service 124 can also support various functions to those user accounts that are members of a server. For example, when an instance of client application 104 establishes a session using sessions service 120, the sessions service 120 can interact with servers/guilds service 124 to provide information regarding the servers to which the user account belongs. The client application 104 can receive identifiers of all servers to which the user account operating the client device associated with client application 104 is a member. While the session is active, client application 104 can request updates regarding one or more of the servers to which the user account operating the client application 104 belongs from servers/guilds service 124.

Community hosting service 102 also provides a safety/moderation service 116. As with any online community, community hosting service 102 occasionally needs to deal with user accounts issuing spam or inappropriate content. While administrators of servers can perform some moderation functions such as suspending user accounts on a particular server or banning user accounts or bots for inappropriate posts or for posting spam, community hosting service 102 can have various software services that attempt to moderate some posts. For example, safety/moderation service 116 can include algorithms designed to detect hate speech or other harmful or inappropriate content. Safety/moderation service 116 can also include algorithms configured to identify communications as spam or phishing. Safety/moderation service 116 can provide various functions to protect users from content posted in a channel and attacks on the client application 104 or the computing device hosting the client application 104.

Community hosting service 102 can also include a data analytics service 118. The data analytics service 118 can provide various services in support of community hosting service 102 and in support of the users of community hosting service 102. For example, data analytics service 118 can monitor the performance of various features of the community hosting service 102 to determine whether updates to features are well received by the user community. The data analytics service 118 can also be used to develop and run various machine learning algorithms and other algorithms designed to identify harmful content, malicious servers, malicious user accounts, and malicious bots 106.

As introduced above, sessions service 120 is configured to authenticate a user account to community hosting service 102. After a user account has been authenticated, the sessions service 120 can determine one or more servers to which the user account is a member or for which the user account is an administrator. The sessions service 120 can send a list of identifiers for the servers associated with the user account to the client application 104. Thereafter, the client application 104 can request information regarding the servers by using a session token that validates that the client application 104 is operating in an authenticated session.

The presence service 122 can be used to provide presence information regarding other members of a server or a channel to which the user account belongs. Through the presence service 122, the client application can convey information about which user accounts are currently active in the server or channel. Likewise, the client application 104 can provide presence information for the user account controlling the instance of client application 104.

Community hosting service 102 can also include a real-time communications service 108. The real-time communications service 108 is configured to support real-time communications such as live voice communications or video conferencing. In some embodiments, the real-time communications service 108 can be a public Internet service located outside a gateway for community hosting service 102. Real-time communications service 108 can provide real-time communications for channels configured to support real-time communications.

Authentication service 126 may assist with receiving authentication (i.e., via OAuth 2) from a third-party application to receive a set of curated data, that is updated over time, pertaining to the third-party application user account. The authentication service 126 serves as a safety measures for the community hosting service 102 when facilitating real-world transactions, especially with regard to authenticating seller user accounts by giving buyer user accounts access to reliable information about the seller as well as restricting certain capabilities to authenticated sellers, as further described below.

FIG. 1 also illustrates a bot 106. The bot 106 can be created and configured by users of the community hosting service 102 and linked to servers chosen by the administrator. In some embodiments, the bot 106 can be configured as a chatbot that can have some understanding of the human language through natural language processing technologies. The bot 106 can be configured to provide some content moderation functions and/or some administrative functions. For example, the bot 106 might be granted permission to invite new members, send messages in a channel, embed links, remove members, delete messages, mute members, and attach files, among other possible functions. In some embodiments, bots 106 can have their own user account and are authenticated using a token. Bots 106 can have full access to all services of community hosting service 102.

While the community hosting service 102 is shown with just one of each service and database, it will be appreciated by those of ordinary skill in the art that community hosting service 102 can include many instances of each service or database, and in some embodiments, there can be different versions of the service or database that may utilize different technologies such as coding languages, database schemes, etc.

In some embodiments, the community hosting service 102 is configured such that the majority of communications between the community hosting service 102 and the client application 104 pass through API layer 110. The client application 104 can request responses from various services provided by the community hosting service 102 from the API layer 110. Additionally, services within the community hosting service 102 can communicate with each other by sending messages through the API layer 110. The client application 104 can also interact with a real-time communications service 108 for voice and video communication services. Although the community hosting service 102 is be described with respect to a particular system architecture and communication flow, it will be appreciated by those of ordinary skill in the art that other system configurations are possible.

Figure 2A:
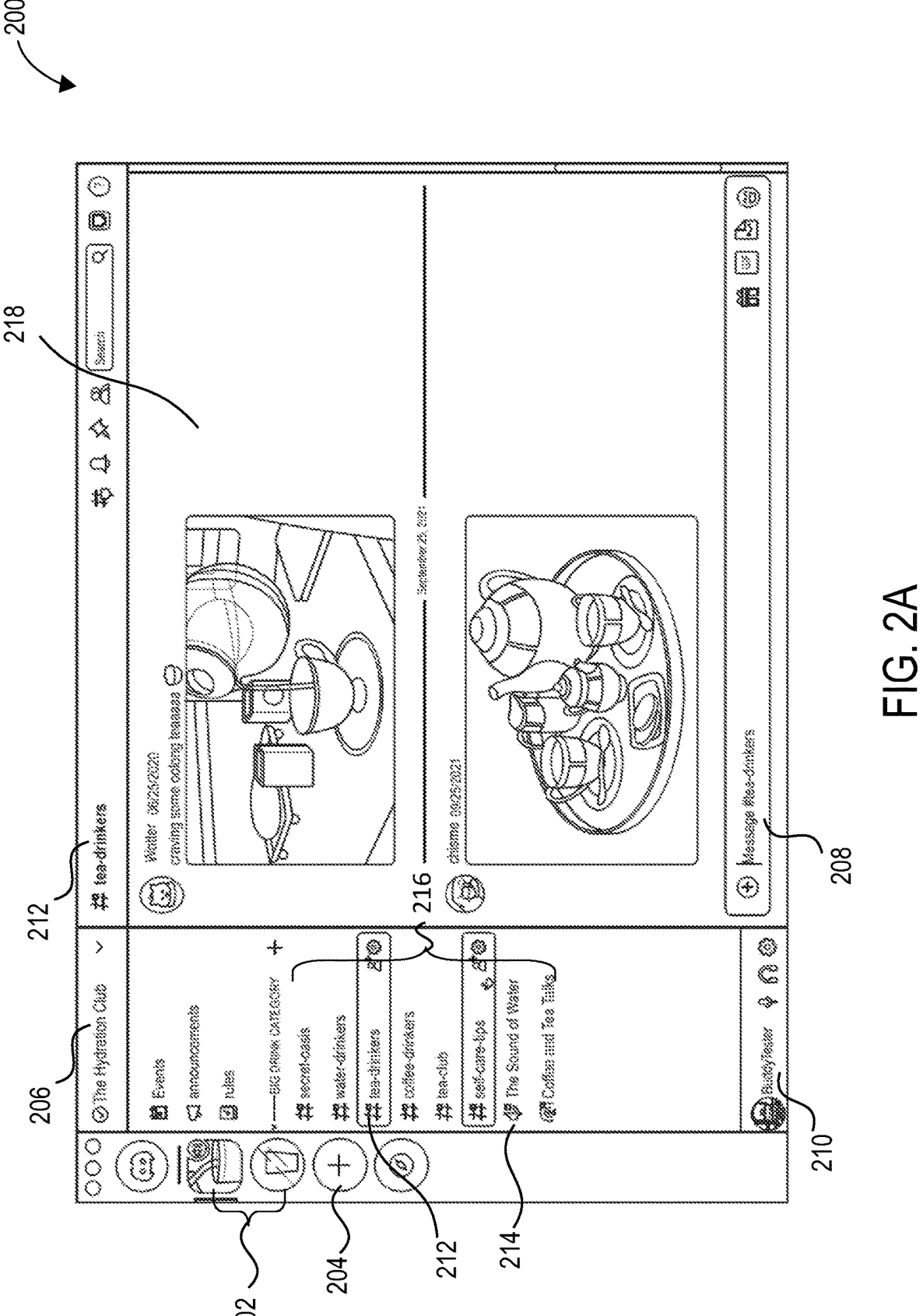
FIG. 2A illustrates an example of a user interface presented by a client application in accordance with some aspects of the present technology.

FIG. 2A illustrates an example of user interface 200 presented by client application 104.

User interface 200 includes icons for servers 202. The top icon has been selected and represents the "hydration club" server. The title 206 of the selected server, the "hydration club," is presented at the top of the user interface 200. User interface 200 also includes a plurality of channels 216 that are part of the server hydration club server. One of the channels, entitled "tea drinkers" 212 is a non-real-time messaging channel. The message thread within the "tea drinkers" channel 214 can be shown within messaging pane 220. As illustrated in FIG. 2A, the messaging pane 218 is configured to present content such as text messages, images, emojis, recorded voice or video files, attachments, etc. A user can provide content to be included in the channel using input interface 208.

User interface 200 also includes a selectable option 204 to add additional servers. User interface 200 also includes a user account icon and controls 210.

Figure 2B:
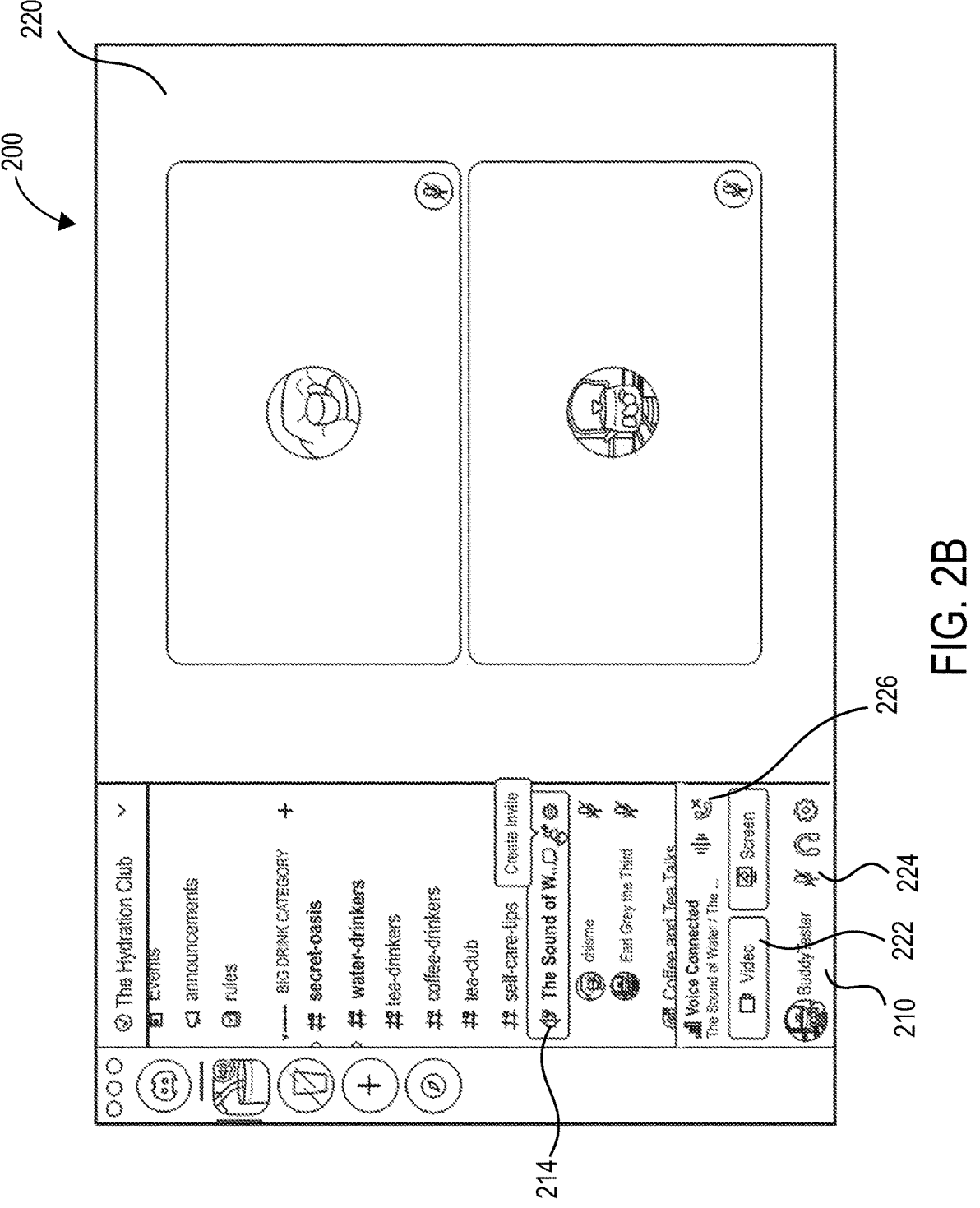
FIG. 2B illustrates an example of a user interface presented by a client application in accordance with some aspects of the present technology.

FIG. 2B illustrates an example of user interface 200 presented by client application 104. In FIG. 2B channel 214 for the channel entitled "sound of water" has been selected. The "sound of water" channel is a real-time communications channel. Accordingly, messaging pane 220 shows two user accounts engaged in real-time communications. As illustrated in FIG. 2B, the user account icon and controls 210 show that the user accounts microphone 224 is muted. Additionally, the user account has options 222 to share their video or screen. The user account can also disconnect from the real-time communications using option 226.

Figure 3:
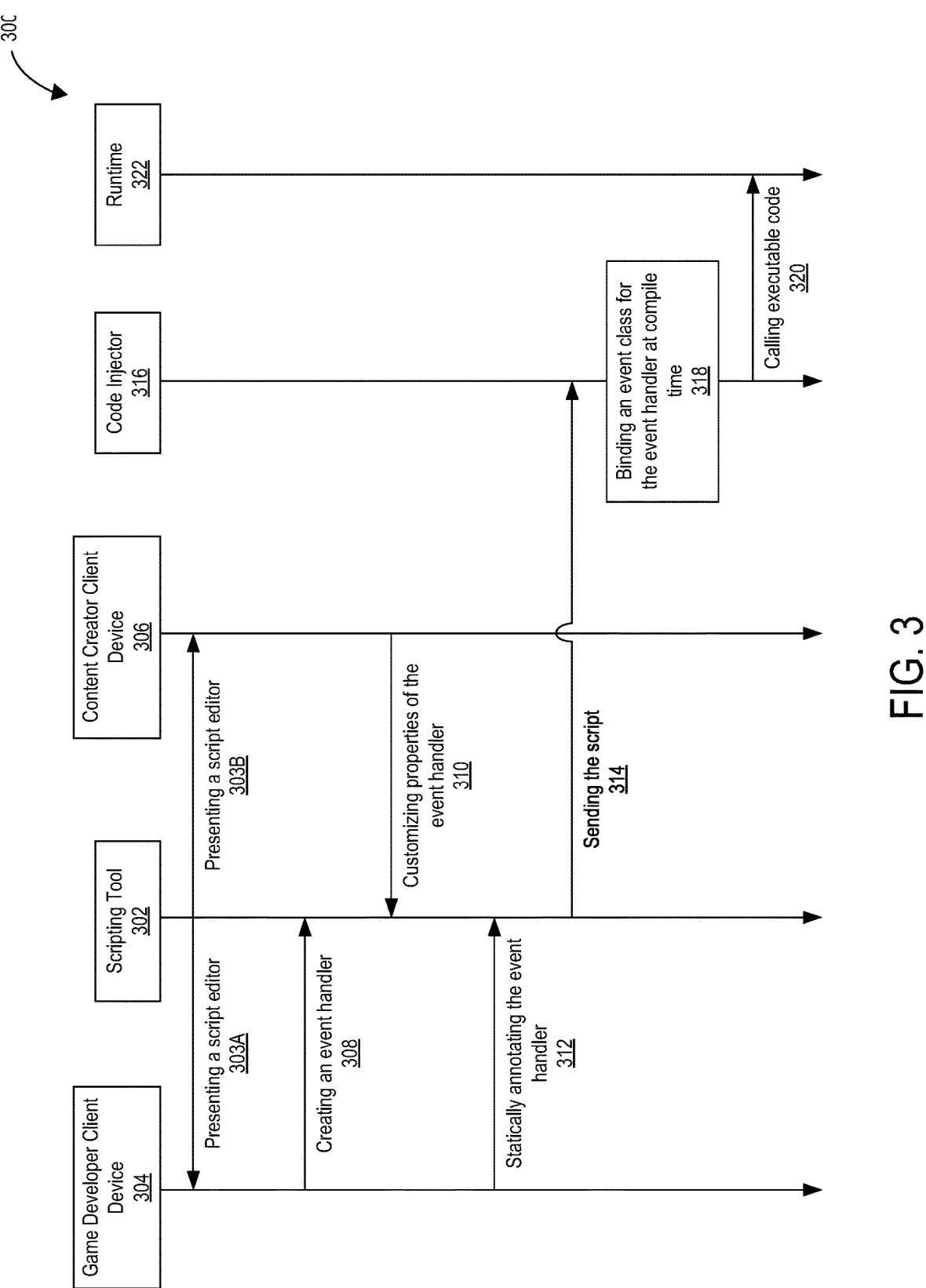
FIG. 3 illustrates an example sequence diagram for game development whereby based on a static annotation in code, a compiler binds an event class for an event handler in code at compile time in executable code, in accordance with some aspects of the present technology.

FIG. 3 illustrates an example sequence diagram 300 for game development. Based on a static annotation in code, a compiler binds an event class for an event handler in code at compile time in executable code, in accordance with some aspects of the present technology.

A scripting tool 302 for creating games may be built on top of an object component architecture of a game engine. The scripting tool 302 may present graphical user interfaces (GUIs) to game developers and content creators (non-coding designers, animators, etc. . . . ) that display an editing framework that allows content creators to more efficiently and effectively develop game effects and events that can then be stored as plug-and-play tools for various gameplay sequences.

In some cases, the scripting tool 302 may present (303A) a script editor to a game developer client device 304, or may present (303B) the script editor to a content creator client device 306. While FIG. 3 only presents one game developer client device 304 and one content creator client device 306, there may be a plurality of each. Both game developers and content creators may view a same script editor. In the script editor, various modules may be viewed and edited, such as an objects manager module, an effects manager module, a physics manager module, etc.

The game developer client device 304, or in some cases, the content creator client device 306, may first create (308) an event handler in code. The event handler in code may be tied to the customized movement of one or more objects within a game environment. The movement may be physical movement within a three-dimensional space in the game environment, effects on the object, and/or other dynamic visual expressions associated with the object. Properties of the event handler in code may be customized (310) by the content creator client device 306, or in some cases, the game developer client device 304. The customization may include a condition selection and/or a respective reaction selection for an object. For example, the object may be a ball, and the condition selected may be that when the ball comes in contact with another ball, the respective reaction selection may be that the ball turns into another color.

Once the customization is completed, when the event handler in code is included in the script, the event handler in code may be tagged with a static annotation (312) in code before compile time. The tagging may be performed by the game developer client device 304, for example, and the script may be from other module such as a physics manager, for example. The script may be sent (314) to a code injector 316 and/or a compiler. In some cases, the compiler, such as a C# compiler, compiles the code from a programming language code, such as C#, to an intermediate language (IL) byte code. The code injector 316 may then load the IL byte code and then modifies it by injecting more IL byte code in a separate pass. Then based on the static annotation, an event class for the event handler in code may be bound (318) in the resulting executable code. The code injector 316 may be a separate layer that injects code into the executable code based on the static annotation. The executable code may then be called (320) at runtime 322.

In some embodiments, the community hosting service 102 may set up a plurality of servers to host members interacting around one or more channels, which may offer the games at runtime. One of the channels may be a voice channel. In some cases, the games that are executed are accessed through the voice channel.

Figures 4A, 4B:
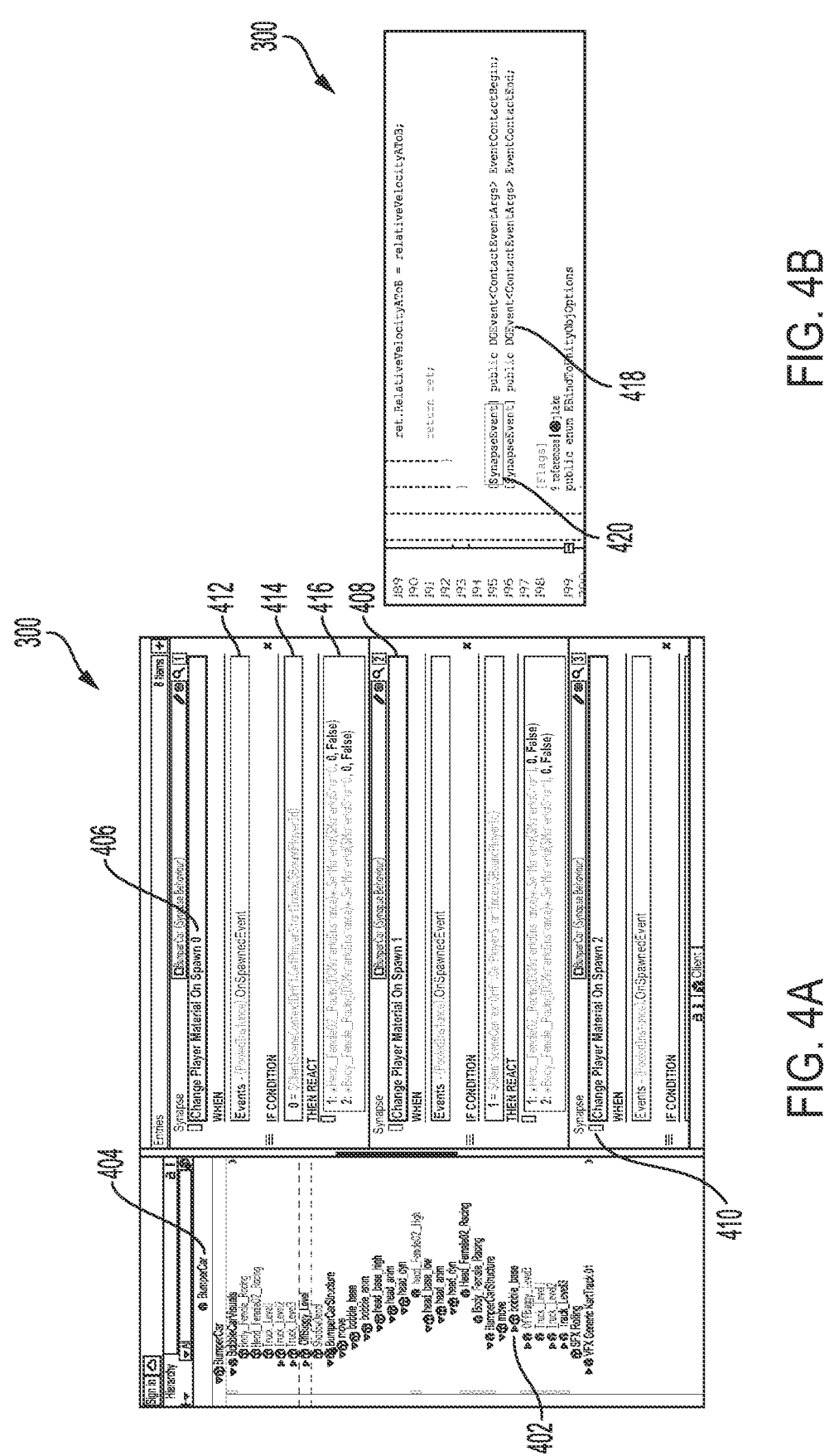
FIG. 4A illustrates an example of a graphical user interface (GUI) associated with the scripting tool presenting a plurality of events associated to an object in accordance with some aspects of the present technology.
FIG. 4B illustrates an example of a static annotation in code on an event handler in code before compile time in accordance with some aspects of the present technology.

FIG. 4A illustrates an example of a graphical user interface (GUI) 400 associated with the scripting tool presenting a plurality of events associated with an object in accordance with some aspects of the present technology.

A GUI associated with the scripting tool, such as GUI 400, may display a plurality of event handlers in code and associated properties for a particular object that can appear in a game environment. There may be an outline view 402 that condenses the various event handlers in code that are associated with each object. In GUI 400, the object 404 is a bumper car, and the example events in focus are "change player material on spawn 0" 406, "change player material on spawn 1" 408, and "change player material on spawn 2" 410. The event handler in code may be associated with a "when" condition 412, an "if" condition 414, and/or a "then react" condition 416. The "when" condition 412 may set a parameter of when the event would occur, the "if" condition 414 may set a parameter for a causal event, and the "then react" condition 416 may set a parameter for how the object may react. As the example GUI 400 shows, for the bumper car, when the bumper car spawns, each event corresponds to a different behavior by the bumper car depending on various conditions.

FIG. 4B illustrates an example of a static annotation in code on an event handler in code before compile time in accordance with some aspects of the present technology.

Once the events are configured, they can be called out in other modules, such as a physics module. Example code in FIG. 4B is an excerpt from the physics module. The event handler 418 may then be tagged with a static annotation 420 in code, e.g. [SynapseEvent], that may be used as an indication to bind an event class for the event handler in code after compile time in the executable code.

Figures 5A, 5B:
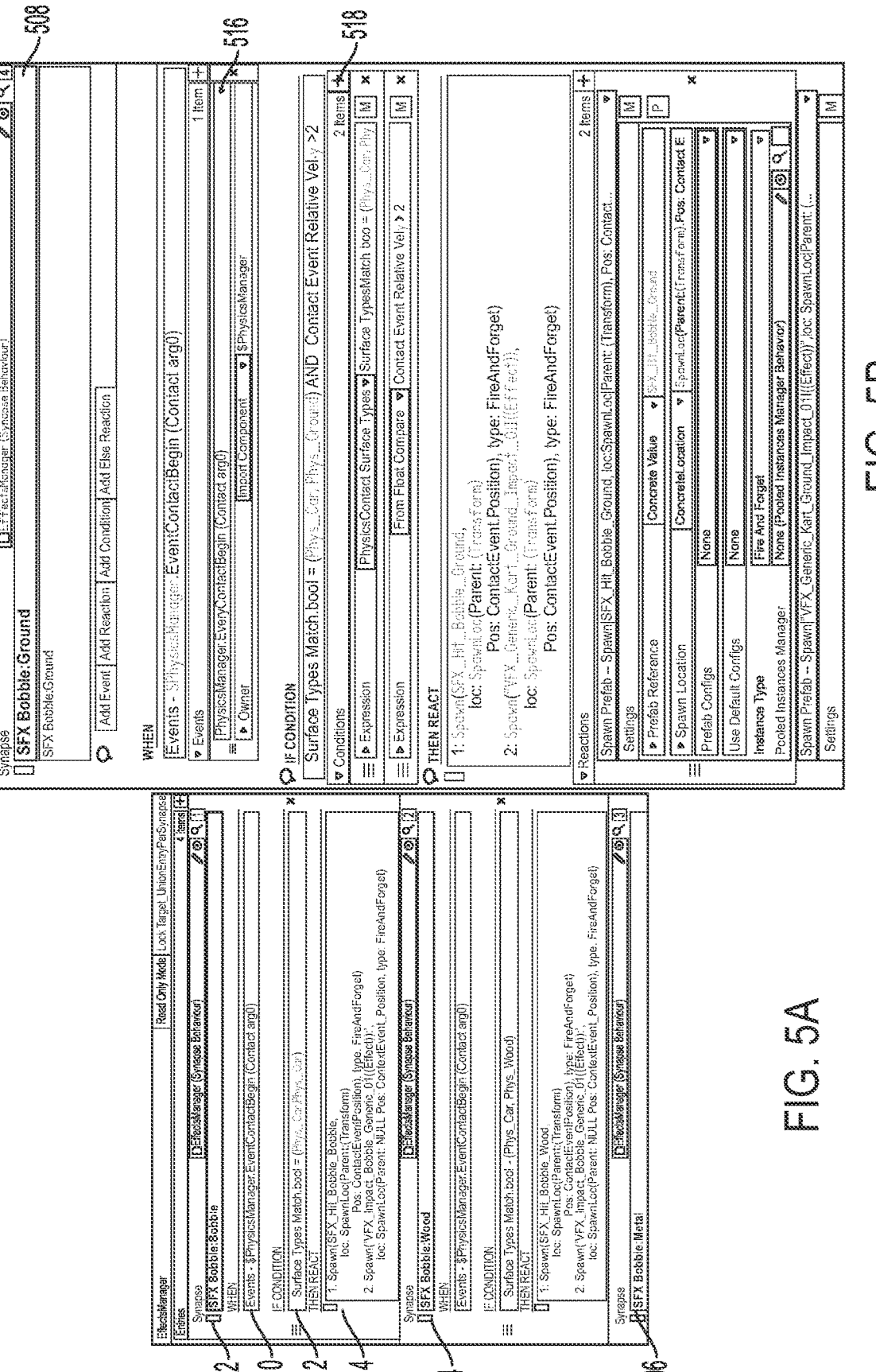
FIG. 5A illustrates an example of a graphical user interface (GUI) presenting a plurality of effects associated with an object in accordance with some aspects of the present technology.
FIG. 5B illustrates an example of a graphical user interface (GUI) presenting a property view of an effect associated with an object in accordance with some aspects of the present technology.

FIG. 5A illustrates an example of a graphical user interface (GUI) presenting a plurality of effects associated with an object in accordance with some aspects of the present technology. FIG. 5B illustrates an example of a graphical user interface (GUI) presenting a property view of an effect associated with an object in accordance with some aspects of the present technology.

Event handlers 418 may also include visual effects that are conditionally set. For example, as shown in FIG. 5A and FIG. 5B, there may be a bobble effect 502, a wood effect 504, a metal effect 506, and a ground effect 508. In a collapsed view, as shown in FIG. 5A, there may be a "when" condition 510, an "if" condition 512, and/or a "then react" condition 514. In an expanded view, as shown in FIG. 5B, more nuanced and detailed properties may be shown and configurable by providing a list of options 516 to select from for a particular property or an add option 518 that allows for adding new and different properties to further configure the effect.

These different effects and events that are configurable in a selection-based process as opposed to a coding process to give non-coding content creators a more effective and efficient manner to add effects and events to objects based on various conditions to form gameplay sequences. Furthermore, once these conditional effects and events are saved, they may be used in different gameplay sequences in a plug-and-play fashion, reducing redundancy in stored data.

FIG. 6 illustrates an example flowchart diagram for binding an event class for an event handler in code at compile time in executable code based on a static annotation in code received before compile time in accordance with some aspects of the present technology.

Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method 600 includes providing a scripting tool for creating one or more games at block 602. For example, the scripting tool 302, illustrated in FIG. 3, may be provided to a client device (e.g., a game development client device or a content creator client device 306). In some cases, the scripting tool may be built on top of an object component architecture of a game engine. The game engine may include other modules (such as a physics manager module) that can be called upon using the scripting tool. In other words, the scripting tool may format various modules that the game engine provides in a way that can be non-coder friendly.

As mentioned above, the method 600 may include causing to present a graphical user interface (GUI) associated with the scripting tool, wherein the scripting tool may cause a display of a client device to present the GUI associated with the scripting tool. The GUI of the scripting may present options for setting conditions and options for setting respective reactions or effects on the object. The GUI may show an outline, such as an outline that expands and collapses, of all the reactions and/or effects for a particular object so that game developers and content creators can quickly assess all the reactions and/or effects for a particular object.

According to some examples, the method 600 includes receiving, at the scripting tool, script including an event handler in code at block 604. The event handler in code may be tied to customized movement of one or more objects within a game environment. For example, the scripting tool 302, illustrated in FIG. 3, may receive a script including the event handler in code. According to some examples, the method 600 includes receiving a static annotation in code on the event handler in code before compile time, at block 606. For example, the scripting tool 302, illustrated in FIG. 3, may receive the static annotation in code. In some cases, the event handler in code may be added to the script without the static annotation in code, and the static annotation is added later. In other cases, the static annotation is added when the event handler in code is added to the script.

According to some examples, the method 600 includes binding an event class for the event handler in code after compile time in executable code based on the static annotation in code at block 608. For example, the scripting tool 302, illustrated in FIG. 3, may bind the event class after compile time. In some cases, the executable code is run at a web browser on a mobile device. In some cases, at compile time, a plurality of event classes is bound for respective event handlers in code that were statically annotated before compile time.

For example, the event handler in code may be associated with two objects colliding in a particular gameplay sequence. The static annotation that tags the event handler in code may then be used at compile time to generate a script that calls from the conditions that the content creators selected. For example, the conditions may be that when two objects collide, if the objects are the same color, then the reaction is that the objects turn into one object. Rather than binding such conditions to the object and searching the object's metadata to invoke events at run time, binding at compile time reduces processing time.

In some cases, a first condition selection for a first respective reaction selection associated with the event handler in code may be received. As such, the bound event class may include code associated with the first condition selection for the first respective reaction selection. Furthermore, the event handler in code, and the first condition selection for the first respective reaction selection, may be saved and reused for a different gameplay sequence.

In some cases, a selection of a scripting representation of one object of the one or more objects at the GUI may be received and the GUI associated with the scripting tool may be caused to present a customizable property view of a plurality of associated conditions and respective reactions for the one object. The customizable property view may allow the addition of new conditions and/or new properties describing the conditions. In some cases, the GUI associated with the scripting tool may be caused to present an effects manager of the scripting tool. The effects manager may display a plurality of association conditions and respective reactions that call a physics manager that defines limitations of physical properties mimicking real-world scenarios.

Figure 7:
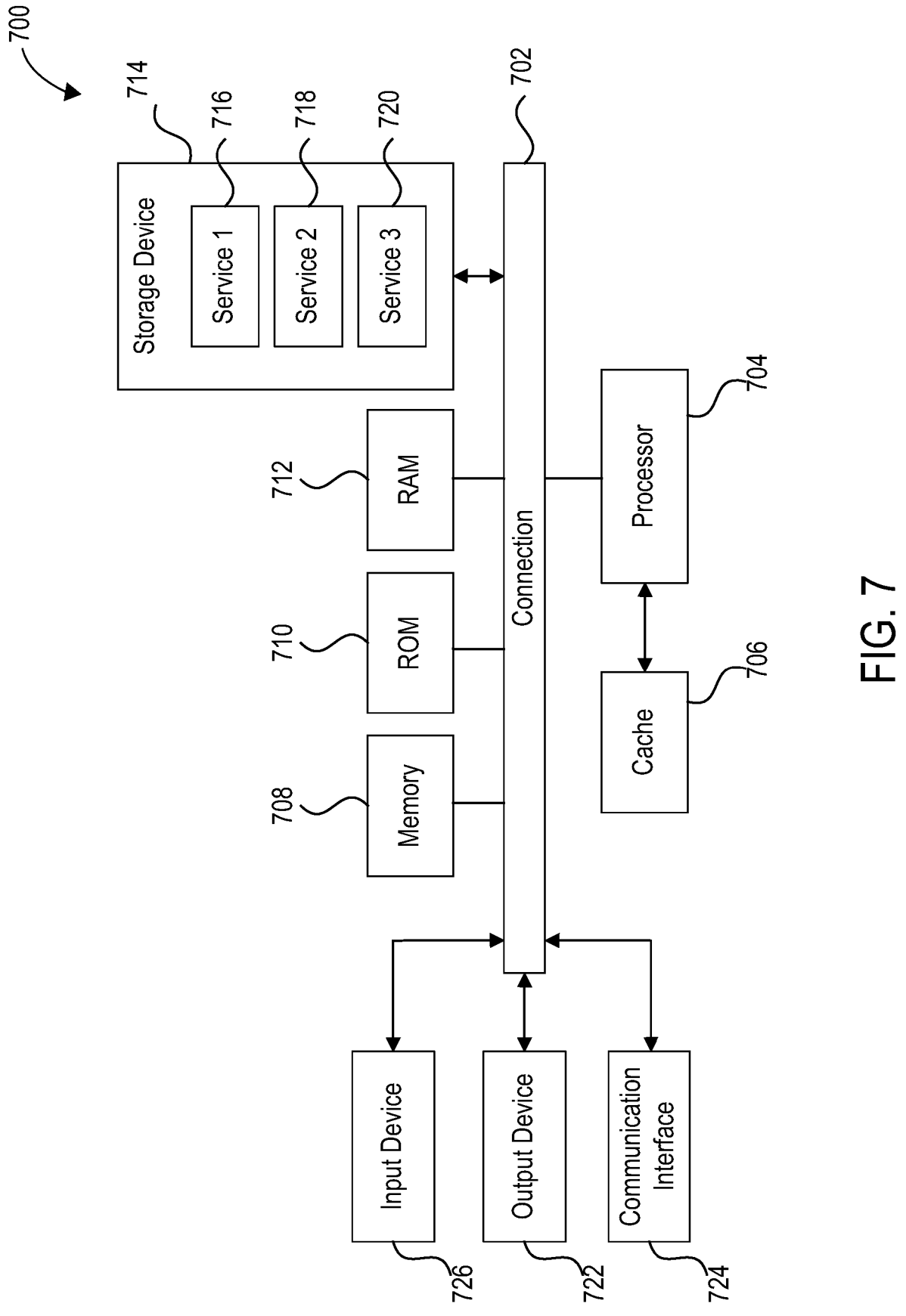
FIG. 7 shows an example of a system for implementing some aspects of the present technology.

FIG. 7 shows an example of computing system 700, which can be for example any computing device making up client application 104, community hosting service 102, or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 710 and random access memory (RAM) 712 to processor 704. Computing system 700 can include a cache of high-speed memory 706 connected directly with, in close proximity to, or integrated as part of processor 704.

Processor 704 can include any general purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that when the code that defines such software is executed by the processor 704, it causes the system to perform a function. In some embodiments, a hardware service that performs a particular function can include the software component stored in a computer-readable medium in connection with the necessary hardware components, such as processor 704, connection 702, output device 722, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A computer-implemented method comprising: providing a scripting tool for creating one or more games; receiving, at the scripting tool, a script including an event handler in code, wherein the event handler in code is tied to a customized movement of one or more objects within a game environment; receiving a static annotation in code on the event handler in code before compile time; and based on the static annotation in code, binding an event class for the event handler in code after the compile time in executable code.

Aspect 2. The computer-implemented method of Aspect 1, further comprising: causing to present a graphical user interface (GUI) associated with the scripting tool; causing the GUI associated with the scripting tool to present first options for setting conditions and second options for setting respective reactions on an object; and receiving a first condition selection for a first respective reaction selection associated with the event handler in code, wherein the event class includes code associated with the first condition selection for the first respective reaction selection.

Aspect 3. The computer-implemented method of any of Aspects 1 to 2, further comprising: saving the first condition selection for the first respective reaction selection in association with the event handler in code; and reusing the saved event handler in code for a different gameplay sequence.

Aspect 4. The computer-implemented method of any of Aspects 1 to 3, further comprising: receiving a selection of a scripting representation of one object of the one or more objects at the GUI; and causing the GUI associated with the scripting tool to present a customizable property view of a plurality of associated conditions and the respective reactions for the one object.

Aspect 5. The computer-implemented method of any of Aspects 1 to 4, further comprising: causing the GUI associated with the scripting tool to present an effects manager of the scripting tool, wherein the effects manager displays a plurality of association conditions and the respective reactions that call a physics manager that defines limitations of physical properties mimicking real-world scenarios.

Aspect 6. The computer-implemented method of any of Aspects 1 to 5, further comprising: running the executable code including the event class at runtime.

Aspect 7. The computer-implemented method of any of Aspects 1 to 6, wherein the executable code is run at a web browser on a mobile device.

Aspect 8. The computer-implemented method of any of Aspects 1 to 7, wherein the scripting tool is built on top of an object component architecture of a game engine.

Aspect 9. The computer-implemented method of any of Aspects 1 to 8, further comprising: binding, at compile time, a plurality of event classes for respective event handlers in code that were statically annotated before the compile time.

Aspect 10. A non-transitory computer-readable medium comprising instructions, the instructions, when executed by a computing system, causes the computing system to: provide a scripting tool for creating one or more games; receive, at the scripting tool, script including an event handler in code, wherein the event handler in code is tied to customized movement of one or more objects within a game environment; receive a static annotation in code on the event handler in code before compile time; and based on the static annotation in code, bind an event class for the event handler in code after compile time in executable code.

Aspect 11. The non-transitory computer-readable medium of Aspect 10, wherein the instructions, when executed by the computing system, causes the computing system to: cause to present a graphical user interface (GUI) associated with the scripting tool; cause the GUI associated with the scripting tool to present first options for setting conditions and second options for setting respective reactions on an object; and receive a first condition selection for a first respective reaction selection associated with the event handler in code, wherein the event class includes code associated with the first condition selection for the first respective reaction selection.

Aspect 12. The non-transitory computer-readable medium of any of Aspects 10 to 11, wherein the instructions, when executed by the computing system, causes the computing system to: save the first condition selection for the first respective reaction selection in association with the event handler in code; and reuse the saved event handler in code for a different gameplay sequence.

Aspect 13. The non-transitory computer-readable medium of any of Aspects 10 to 12, wherein the instructions, when executed by the computing system, causes the computing system to: receive a selection of a scripting representation of one object of the one or more objects at the GUI; and cause the GUI associated with the scripting tool to present a customizable property view of a plurality of associated conditions and the respective reactions for the one object.

Aspect 14. The non-transitory computer-readable medium of any of Aspects 10 to 13, wherein the instructions, when executed by the computing system, causes the computing system to: cause the GUI associated with the scripting tool to present an effects manager of the scripting tool, wherein the effects manager displays a plurality of association conditions and the respective reactions that call a physics manager that defines limitations of physical properties mimicking real-world scenarios.

Aspect 15. The non-transitory computer-readable medium of any of Aspects 10 to 14, wherein the instructions, when executed by the computing system, causes the computing system to: running the executable code including the event class at runtime.

Aspect 16. The non-transitory computer-readable medium of any of Aspects 10 to 15, wherein the executable code is run at a web browser on a mobile device.

Aspect 17. The non-transitory computer-readable medium of any of Aspects 10 to 16, wherein the scripting tool is built on top of an object component architecture of a game engine.

Aspect 18. The non-transitory computer-readable medium of any of Aspects 10 to 17, wherein the instructions, when executed by the computing system, causes the computing system to: bind, at compile time, a plurality of event classes for respective event handlers in code that were statically annotated before the compile time.

Aspect 19. A system comprising: one or more processors; and a non-transitory computer-readable medium comprising instructions, the instructions, when executed by the one or more processors, causes the one or more processors to: provide a scripting tool for creating one or more games; receive, at the scripting tool, script including an event handler in code, wherein the event handler in code is tied to customized movement of one or more objects within a game environment; receive a static annotation in code on the event handler in code before compile time; and based on the static annotation in code, bind an event class for the event handler in code after the compile time in executable code.

Aspect 20. The system of Aspect 19, wherein the instructions, when executed by the one or more processors, causes the one or more processors to: cause to present a graphical user interface (GUI) associated with the scripting tool; cause the GUI associated with the scripting tool to present first options for setting conditions and second options for setting respective reactions on an object; and receive a first condition selection for a first respective reaction selection associated with the event handler in code, wherein the event class includes code associated with the first condition selection for the first respective reaction selection.

What is claimed is:

1. A computer-implemented method comprising:
providing a scripting tool for creating one or more games;

receiving, at the scripting tool, a script including an event handler, wherein the event handler corresponds to a customized movement of one or more objects within a game environment;

inserting a static annotation into code corresponding to the event handler before compile time; and based on the static annotation in the code, binding an event class for the event handler at the compile time in executable code, wherein the event handler is statically linked at the compile time.

2. The computer-implemented method of claim 1, further comprising:

causing to present a graphical user interface (GUI) associated with the scripting tool;

causing the GUI associated with the scripting tool to present first options for setting conditions and second options for setting respective reactions on an object; and receiving a first condition selection for a first respective reaction selection associated with the event handler-in cede, wherein the event class includes code associated with the first condition selection for the first respective reaction selection.

3. The computer-implemented method of claim 2, further comprising:

saving the first condition selection for the first respective reaction selection in association with the event handler; and reusing the saved event handler for a different gameplay sequence.

4. The computer-implemented method of claim 2, further comprising:

receiving a selection of a scripting representation of one object of the one or more objects at the GUI; and causing the GUI associated with the scripting tool to present a customizable property view of a plurality of associated conditions and the respective reactions for the one object.

5. The computer-implemented method of claim 2, further comprising:

causing the GUI associated with the scripting tool to present an effects manager of the scripting tool, wherein the effects manager displays a plurality of association conditions and the respective reactions that call a physics manager that defines limitations of physical properties mimicking real-world scenarios.

6. The computer-implemented method of claim 1, wherein the static annotation comprises a decorator for a function of a class that is provided to the code before compiling into byte code.

7. The computer-implemented method of claim 1, wherein the executable code is run at a web browser on a mobile device.

8. The computer-implemented method of claim 1, wherein the scripting tool is built on top of an object component architecture of a game engine.

9. The computer-implemented method of claim 1, further comprising:

binding, at the compile time, a plurality of event classes for respective event handlers that were statically annotated before the compile time.

10. A non-transitory computer-readable medium comprising instructions, the instructions, when executed by a computing system, causes the computing system to:

provide a scripting tool for creating one or more games;

receive, at the scripting tool, script including an event handler, wherein the event handler corresponds to customized movement of one or more objects within a game environment;

insert a static annotation into code corresponding to the event handler before compile time; and based on the static annotation in the code, bind an event class for the event handler at the compile time in executable code, wherein the event handler is statically linked at the compile time.

11. The non-transitory computer-readable medium of claim 10, wherein the instructions, when executed by the computing system, causes the computing system to:

cause to present a graphical user interface (GUI) associated with the scripting tool;

cause the GUI associated with the scripting tool to present first options for setting conditions and second options for setting respective reactions on an object; and receive a first condition selection for a first respective reaction selection associated with the event handler, wherein the event class includes code associated with the first condition selection for the first respective reaction selection.

12. The non-transitory computer-readable medium of claim 11, wherein the instructions, when executed by the computing system, causes the computing system to:

save the first condition selection for the first respective reaction selection in association with the event handler; and reuse the saved event handler for a different gameplay sequence.

13. The non-transitory computer-readable medium of claim 11, wherein the instructions, when executed by the computing system, causes the computing system to:

receive a selection of a scripting representation of one object of the one or more objects at the GUI; and cause the GUI associated with the scripting tool to present a customizable property view of a plurality of associated conditions and the respective reactions for the one object.

14. The non-transitory computer-readable medium of claim 11, wherein the instructions, when executed by the computing system, causes the computing system to:

cause the GUI associated with the scripting tool to present an effects manager of the scripting tool, wherein the effects manager displays a plurality of association conditions and the respective reactions that call a physics manager that defines limitations of physical properties mimicking real-world scenarios.

15. The non-transitory computer-readable medium of claim 10, wherein the static annotation comprises a decorator for a function or a class that is provided to the code before compiling into byte code.

16. The non-transitory computer-readable medium of claim 10, wherein the executable code is run at a web browser on a mobile device.

17. The non-transitory computer-readable medium of claim 10, wherein the scripting tool is built on top of an object component architecture of a game engine.

18. The non-transitory computer-readable medium of claim 10, wherein the instructions, when executed by the computing system, causes the computing system to:

bind, at the compile time, a plurality of event classes for respective event handlers that were statically annotated before the compile time.

19. A system comprising:

one or more processors; and a non-transitory computer-readable medium comprising instructions, the instructions, when executed by the one or more processors, causes the one or more processors to:

provide a scripting tool for creating one or more games; 5 receive, at the scripting tool, script including an event handler, wherein the event handler corresponds to customized movement of one or more objects within a game environment;

insert a static annotation into code correspond to the event 10 handler before compile time; and based on the static annotation, bind an event class for the event handler after the compile time in executable code, wherein the event handler is statically linked at the compile time. 15

20. The system of claim 19, wherein the instructions, when executed by the one or more processors, causes the one or more processors to:

cause to present a graphical user interface (GUI) associated with the scripting tool; 20 cause the GUI associated with the scripting tool to present first options for setting conditions and second options for setting respective reactions on an object; and receive a first condition selection for a first respective reaction selection associated with the event handler, 25 wherein the event class includes code associated with the first condition selection for the first respective reaction selection.

\* \* \* \* \*